July 8, 1930.  H. FRÖHLICH  1,770,204
ELECTRIC METER
Filed Oct. 19, 1926
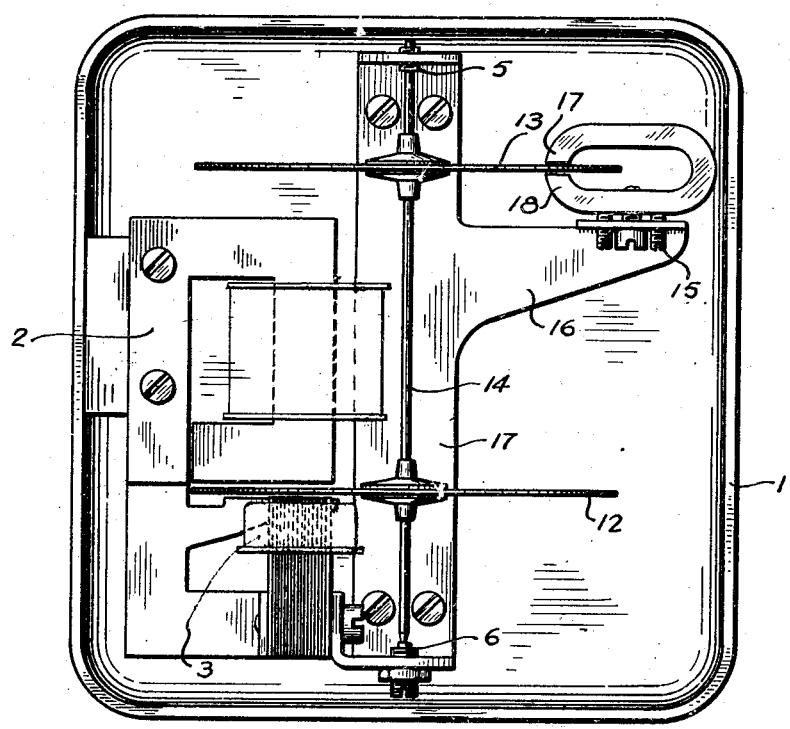
Inventor:
Hans Fröhlich
By John D. Morgan
Attorney.

Patented July 8, 1930

1,770,204

UNITED STATES PATENT OFFICE

HANS FRÖHLICH, OF ZUG, SWITZERLAND, ASSIGNOR TO LANDIS & GYR, A.-G., A JOINT-STOCK COMPANY OF SWITZERLAND

ELECTRIC METER

Application filed October 19, 1926, Serial No. 142,569, and in Switzerland October 30, 1925.

The invention relates to a compensating meter disc, and more particularly to a novel and useful mechanism for obviating the errors due to temperature changes.

Objects and advantages of the invention will be set forth in part hereinafter, and in part will be obvious herefrom to those skilled in the art, the same being realized and effected through the means pointed out in the appended claims.

The accompanying drawing, referred to herein and constituting a part hereof, illustrates one form of mechanism embodying the invention; said drawing together with the description serving to explain and illustrate the principles of the invention.

In practically all forms of existent electricity meters changes in temperature produce more or less correspondent changes in the curve of errors, and thereby the registering of the current by the meter, except at a single predetermined temperature, is affected by a corresponding error. The purpose of the present invention is to eliminate entirely, or substantially so, this factor or error in the registering of the meter induced by variations in temperature.

These errors in the registering action of meters are principally due to the fact that, with changes in temperature, the action of the torque upon the driving element of the meter and the action of the braking force do not maintain the same relation. One of the main objects of the present invention is to control the action of the torque and of the braking force upon the driving element of the meter so that they may be maintained in practically the predetermined uniform relation irrespective of the temperature changes.

According to one feature of the invention, and as embodied in the illustarted mechanism, the rotating member of the meter comprises two different elements, upon one of which the torque acts to drive the meter and upon the other of which the braking action is exerted. These two elements have different physical characteristics, which are affected by changes in temperature, so as to effect the desired result, namely, to maintain the predetermined relation between the torque action and the braking action substantially uniform and thereby secure correct registration despite changes in the temperature. Accordingly, and as embodied, the driven meter element has a member acted upon by the torque of the coils, and another element acted upon by the brake and having a different temperature coefficient such that the balance or relation between the torque action and the braking action is maintained substantially unaffected by temperature changes.

In the present preferred embodiment of the invention, this is accomplished by using for the driven element of the meter which is acted upon by the brake, an alloy of aluminum, copper, silicon and iron, which alloy may be varied in its proportions as may be found desirable or necessary to effect the desired object. It will be understood further that within the broader aspects of the invention, the constituents of this alloy may be changed as found desirable, or some single metal having the proper and necessary physical characteristics might be utilized.

Referring now in detail to the embodiment of the invention exemplarily illustrated in the accompanying drawing, a meter casing 1, of suitable form is provided, and enclosed therewithin is a pressure coil or coils 2, and a current coil or coils 3, which may be of any suitable form or design. A meter spindle 4 is mounted in bearings 5 and 6, carried by a supporting frame 7. A meter disc 12 is fixed on the spindle 4, and moves in the field of the coils in the usual or other suitable position and manner.

In the present embodiment, I prefer to utilize a separate member, having the characteristics already described, to be acted upon by the magnetic brake. Accordingly, as embodied, a disc 13 is likewise fixed to the shaft 4, which disc at present preferably consists of the alloy of the aluminum, copper, silicon and iron already mentioned. One practical example of percentage alloys for the disc is: copper—2.82; silicon—0.70; iron—0.23; and aluminum—96.25. It will be understood, however, that the constituency of this member may be varied as found desirable. A magnetic brake 14, which may be of usual form, is adjustably mounted at 15 upon a bracket arm 16 of the frame 7, and has its poles 17 and 18 positioned at either side of the disc 13.

The registering mechanism of the meter and the connections between it and the spindle 4 are not shown in the drawings, and may be of any usual or suitable form, and are omitted for the sake of clearness.

From the foregoing it will be understood that a mechanism has been provided for eliminating and rectifying the temperature variation errors arising in electricity meters; and it will be further understood that changes may be made in the exemplified mechanism, within the scope of the accompanying claims, without departing from the principles of the invention and without sacrificing its chief advantages.

What I claim is:—

1. An electric meter of the Ferrari type, comprising a driving disc and a second temperature-compensating braking disc made of an aluminium alloy, the two discs being connected to rotate in unison, the temperature coefficient of the braking disc being less than that of the driving disc.

2. An electric meter of the Ferrari type, comprising a driving disc and a second temperature-compensating braking disc made of an aluminium alloy, the two discs being connected to rotate in unison, the temperature coefficient of the braking disc being less than that of the driving disc, the braking disc having a magnetic brake while the driving disc has no magnetic brake.

3. An electric meter of the Ferrari type comprising a driving disc having no magnetic brake, a temperature compensating braking disc connected to rotate in unison with the driving disc and provided with a magnetic brake, the braking disc being made of material having a temperature coefficient less than that of the driving disc.

In testimony whereof, I have signed my name to this specification.

HANS FRÖHLICH.